Aug. 7, 1945.  E. C. HOFFMAN  2,381,165
METHOD OF AIDING IN THE CREATION OF A LINE RENDITION
IN TRUE PERSPECTIVE OF AN OBJECT TO BE DEPICTED
Filed Aug. 19, 1943  2 Sheets-Sheet 2
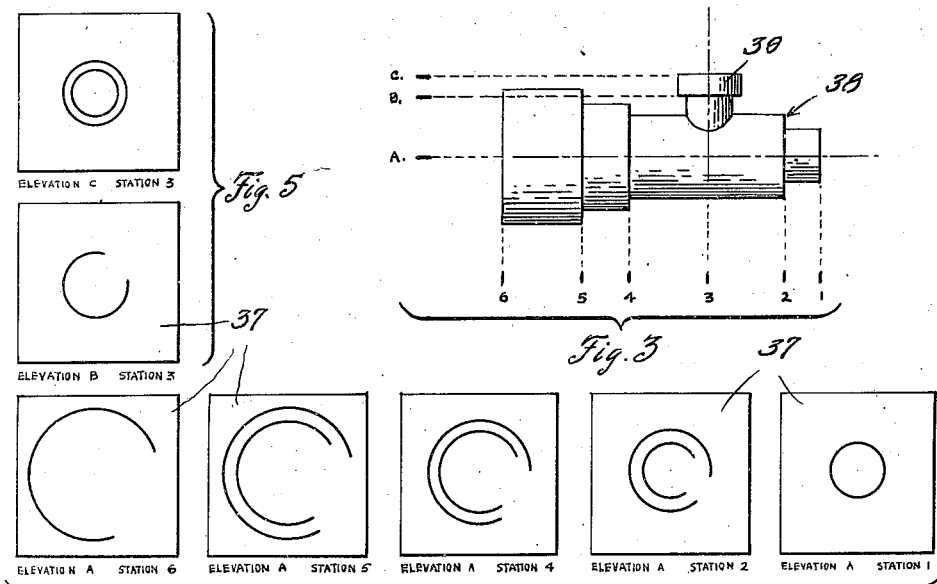
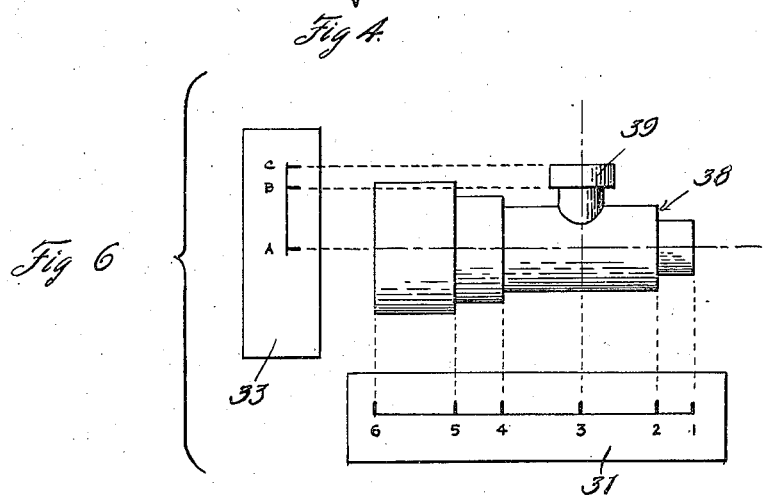
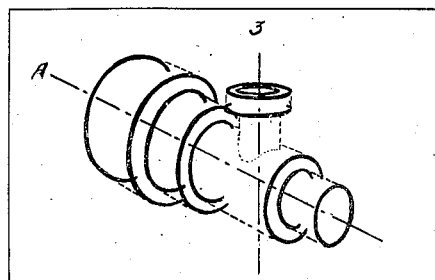
INVENTOR
EDWARD C. HOFFMAN
BY
ATTORNEY Patented Aug. 7, 1945

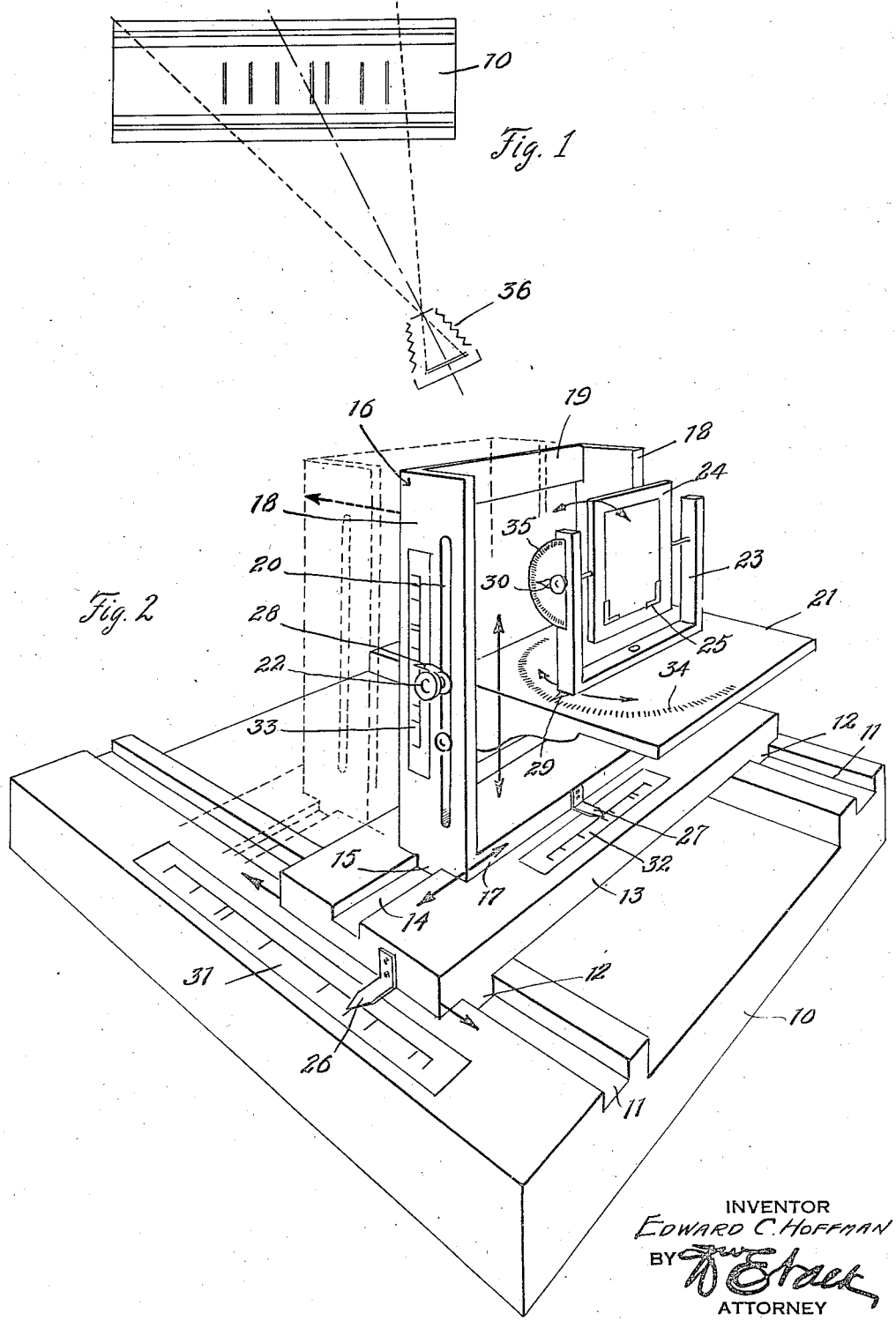

2,381,165

UNITED STATES PATENT OFFICE 2,381,165

METHOD OF AIDING IN THE CREATION OF A LINE RENDITION IN TRUE PERSPECTIVE OF AN OBJECT TO BE DEPICTED

Edward C. Hoffman, Montclair, N. J.

Application August 19, 1943, Serial No. 499,288

6 Claims. (Cl. 35—26)

My invention relates to a method of aiding in the creation of a line rendition in true perspective of an object to be depicted.

Industrial, advertising and other concerns are frequently called upon to prepare for illustrative purposes accurate drawings, in true perspective, of various types of machines and other mechanical devices—many including so-called cutaway interiors. To do this sort of work, skilled draftsmen or artists, versed in three-dimensional visualization, are employed; and if accuracy is to be achieved, the resulting drawing or line rendition must be constructed geometrically on various selected axes because of the difficulty of drawing circles and other irregular shapes in true perspective.

I am fully aware that instruments such as ellipsographs have been developed and used for drawing ellipses, ovals and other irregular shapes in outline. Such instruments, if used, present the difficulty of accurately locating the position of a given curved line as well as of making neat and accurate lines of juncture where the several curved lines are required to be joined. If first done in pencil, the drawing must thereafter be traced or done over again in ink. If done originally in ink, in all probability the lines to be joined will vary in sharpness, accuracy and width. In other words, where previously existing methods are used, the creation of a line rendition in true perspective of a object to be depicted involves time-consuming, painstaking, tedious effort and consummate skill far beyond that possessed by the average draftsman.

One object of the present invention is to provide a method by which the location of all lines, surfaces and sections of a drawing or illustration may be accurately obtained without recourse to the labor and work involved in following the procedure heretofore adopted. Of equal importance is the advantage resulting from the simple manner in which circles and other odd shapes in true perspective may be rendered by draftsmen or artists of only ordinary skill.

Other objects and advaantages of the invention will be hereinafter set forth.

In the drawings, wherein like reference characters denote like or corresponding parts:

Fig. 1 is a schematic view of an apparatus found to be useful in the practice of the method employing the present invention—the camera used in the practice of such method being so positioned relatively to the apparatus that its optical axis intersects the plane of the carrier thereof at an angle appropriate to the selected true perspective which it is desired to render by the method which the invention contemplates shall be used;

Fig. 2 is a perspective view of such apparatus—the dotted lines showing one position of adjustment of the carrier frame;

Fig. 3 is a side elevation of a typical object—a line rendition of portions of which may be depicted in true perspective by the method herein disclosed;

Fig. 4 is a plan view of a series of sheets or the like having outlined thereon in true perspective and to full scale the shapes of different linearly spaced portions of the object shown in Fig. 3, i. e., spaced along the major axis A of said figure;

Fig. 5 is a plan view, similar to the plan view of Fig. 4, showing sheets or the like having outlined thereon in true projection and to full scale the shapes of different linearly spaced portions of the object, the spacing in this figure of the portions being along an axis at right angles to the axis A of Fig. 4;

Fig. 6 is a plan view illustrating the manner in which the scales usable in the practice of the method of my invention are laid out, and Fig. 7 is a view in true perspective showing the outlines photographed by successive exposures of the same sensitized medium and as they appear on the sensitized medium itself.

The apparatus recommended for use in the practice of the method concerned is best illustrated in Fig. 2. It preferably comprises a support or base 10 provided with parallel laterally spaced grooves 11—11. Within the grooves 11—11 rails 12—12 formed on the under side of a carrier 13, are fitted. The carrier 13 is slidably adjustable lengthwise of the base 10 and on its topside is provided with a groove 14 within which a correspondingly shaped rail 15, mounted to the frame 16, is fitted. Like the carrier 13, the frame 16 is slidably adjustable relatively to the base 10—the direction of adjustment of the two, however, being at right angles one to the other.

The frame 16 is generally of rectangular form and comprises a base portion 17, two upright side members 18—18, and a cross connection 19. In each side member 18 a slot 20 is formed, and between the side members 18—18 a table 21 is fitted. This table is vertically adjustable relatively to the frame 16 and is held to any adjusted position by one or more thumbscrews 22. Preferably, the table 21 projects well beyond and to one side only of its supporting frame.

Mounted on the top face of the table 21 is a so-called gimbal unit. This unit is rotatable about a vertical axis relatively to the table 21 and preferably comprises a substantially U-shaped frame portion 23 between the side arms or legs of which a freely tiltable or rotatable carrier frame 24 is mounted. The axis about which the carrier frame 24 is tiltable or rotatable is preferably perpendicular to the axis of rotation of the gimbal unit as a whole. Suitable ledges or fittings 25, the purpose of which will be apparent hereinafter, are fastened to and movable with the carrier frame.

Each portion of the apparatus adjustable relatively to its associated portion is provided with an index or pointer, and each index or pointer is adapted for cooperation with a suitable scale. The indices are designated, respectively, 26, 27, 28, 29 and 30, whereas the scales with which they respectively cooperate are designated as 31, 32, 33, 34 and 35. Collectively, these indices and scales provide a means for indicating the adjusted position of each adjustable portion of the apparatus in any given case.

The only other parts required to be provided are a camera 36 and a suitable number of sheets or the like 37. As will be hereinafter pointed out, the sheets or the like 37, in the practice of the invention, are preferably placed before the camera 36, each at an angle to its optical axis after the manner shown in Fig. 1.

Having described the apparatus per se, perhaps the simplest way to explain the method of the invention is to point out the manner in which the apparatus is used in putting the method into practice. In Fig. 3, by way of example, an object 38 is shown. This particular object is provided with a right angle extension 39. The major axis of the object is indicated by the broken line A, whereas the axis of the right angle extension 39 thereof is indicated by the broken line B. Note that the object along each of said axes is circular in cross-section, and that at different stations along the axes the size of the object varies in diameter.

The method herein taught—and which method is definitely an aid in the creation of a line rendition in true perspective of the object shown—consists essentially in outlining on the separate sheets or the like 37, in true projection and to appropriate scale, the actual shapes of the different portions of the said object at the stations 1, 2, 4, 5 and 6 along the major axis A and at the stations C and B along the minor axis 3. In making such outlines, preferably a white line on a sheet or the like 37 having a dark or non-reflecting background is used. This for the reason that the photographic plate or other sensitized medium employed will, upon exposure, be affected only where the white line occurs—leaving the balance of the plate clear to receive in the selected sequence the several outlines which the total number of sheets 37 depict.

Having made the outlines indicated in Figs. 4 and 5 on the sheets 37, and to insure accuracy in the photographing thereof, it is desirable to prepare scales such as the scales 31 and 33 of Fig. 6 (same being appropriate to the particular object shown). These scales 31 and 33 may be made to any scale desired, depending, of course, upon the size of the object to be photographed and the size of the rendition selected for creation. The same procedure is followed where other scales, such as the scale 32, are required to be used.

As shown in Fig. 6, the scales 31 and 33 are full size, since the outlines shown in Figs. 4 and 5 are drawn in proper projection and to full scale. Where the scales are full size, all that is necessary is to project the lines indicating the stations of the object to be depicted on to the scale sheets as indicated in Fig. 6. The scale sheets, when completed, are fastened to the apparatus, as indicated in Fig. 2—the scale 31 being traversed by the index 26; the scale 32 being traversed by the index 27, and the scale 33 being traversed by the index 28. The remaining scales 34 and 35, which indicate degrees of an arc, are respectively traversed by the indices 29 and 30.

The outlines to be photographed having been scribed on the several sheets 37, and the scales required having been made, the next step is to proceed with the actual photographing of the sheets. Photographing may be done with any suitable camera, such as that indicated at 36 of Fig. 1. Depending upon the perspective showing which it is desired to achieve, each sheet 37 on which the various outlines are shown, is successively placed before the camera, each preferably at an angle other than a right angle to its optical axis, and each spaced relatively to the other accordingly as the markings on the previously prepared scales are spaced. In placing the sheets before the camera in the sequence required, care should be exercised to see to it that each is fitted to the frame 24 in exactly the same location—using to this end the sheet-supporting ledges or fittings 25 which, if desired, may be made adjustable.

In the actual photographing of the outlines on the sheets 37, a multiple exposure of the same photographic plate or other sensitized medium is effected. Preferably, the camera 36 is set up so that its focal axis intersects the geometric center of the linearly spaced markings on the scale prepared and conforming to the stations spaced along the major axis of the object. Once set up, the position of the camera should remain fixed. All that is required to a successful practice of the method insofar as the actual photographing is concerned, is to make sure that the first and last exposures fall within the field of the camera lens.

Having photographed the sheets depicting the outlines at the stations 1, 2, 4, 5 and 6, it is a simple matter to obtain by further exposures of the same photographic plate, a photograph of the sheets depicting the outlines at the stations B and C. To insure, however, that the latter outlines will appear on the plate in the same relative position with respect to the outlines previously photographed as do the corresponding portions of the object appear in space, it is necessary, before effecting further exposures, to see to it that the frame 24 is turned through 90° and that the table 21 is adjusted vertically to bring the index 28 into registry with one or the other of the markings B or C on the scale 33.

From the foregoing, it is obvious that a line rendition in true perspective of portions of any given object may be obtained through the use of the method herein taught. With an apparatus such as disclosed, the frame 24 is capable of movement relatively to the camera 36 in any direction and to any angle relatively to its focal axis. It is essential in making the outlines on the several sheets that the centers thereof be accurately located so as to coincide with the axes of the object. If all outlines or sections are drawn to the same scale, as in the case of a three-view engineering drawing, then the linear distance between the successive positions of the sheets will be the same as the distance between the sections or stations in the longitudinal view of the three-view drawing. The angle of perspective will, of course, depend upon the closeness of the camera to the mean position of the sequence of sheets and to the angle between the sheets and the focal axis of the camera.

Having obtained by multiple exposures of one and the same photographic plate or other sensitized medium, a composite picture of all of the outlines required in a given case, the artist or draftsman is given a more or less basic outline such as that shown in Fig. 7. By simply connecting the outside edges of the circles (photographed as ovals) the basic outline is made complete. If thereafter the undesired portions of the curves or outlines are blacked out, and a negative photostat made of the resulting print, obviously a drawing showing black lines on a white background will result, i. e., a drawing in which all ovals, ellipses, irregularly shaped curves and the like, will appear in true perspective and spaced accurately accordingly as the corresponding portions of the object are located in space. The resulting depiction gives the artist an accurately scaled outline drawing from which the finished drawing, shaded either in black and white or graded tones, may be made.

It is quite possible in the use of the apparatus to make as many as thirty or forty exposures, or even more, depending upon the length of exposure and the sensitivity of the plate or film used. All parts of the apparatus (and especially the frame 24) should be provided with a black or other non-reflecting surface so as to avoid any high-lights or back glare into the camera eye. It is also important to focus the camera on the mean center station of the group of sheets, and then cut down the shutter opening so that all stations in front and behind the mean position will be in focus without changing the position of the camera. This will result in sharp lines being obtained for all stations throughout the full range—the aperture and length of exposure used depending on the overall length of the drawing to be made.

In conclusion, it may be pointed out that certain portions of a large and complicated machine may be photographed as herein taught with separate set-ups of the machine in proper perspective, but for later assembly by pasting prints together on a drawing board. Having a negative of the entire result would permit several artists to work on different parts of the drawing for later assembly into the whole. On sections or portions other than circles it would, of course be quite easy to produce a scale face view of such an outline (a cam or master rod on an engine, for instance) by directly tracing from a blueprint and then photographing at an angle the outline thus obtained. The main advantage of the invention, however, is that resulting from the ease with which circles may be depicted accurately as to perspective, curvature and position without any skill on the part of the draftsman other than an ability to use compasses in preparing the sheets.

While I have described the method constituting my invention and the details of the present preferred apparatus for carrying the method into effect, it will be obvious to those skilled in the art, after understanding my invention, that various changes and modifications may be made therein without departing from the spirit or scope thereof. I aim in the appended claims to cover all such modifications and changes.

I claim as my invention:

1. The method of obtaining spaced basic lines from which a line drawing in true perspective of an object to be drawn may be completed which consists in first drawing on separate sheets or the like, and to a given scale, at least a portion of the actual outline of different selected spaced portions of said object; in next photographing with a camera by successive exposures of one and the same sensitized medium, each said outline; said sheets or the like on which said selected outlines are drawn being placed within the field of the camera lens so as to occupy the same position in space with respect to each other and to the camera lens as would the corresponding parts of the object if so placed and viewed; and in thereafter transferring onto a sheet on which the completed drawing is to be made the outlines so photographed.

2. The method of obtaining spaced basic lines from wihch a line drawing in true perspective of an object to be drawn may be completed which consists in first drawing on separate sheets or the like, and to a given scale, at least a portion of the actual outline of different selected spaced portions of said object; in next photographing with a camera by successive exposures of one and the same sensitized medium, each said outline without changing the position of the camera; said sheets or the like on which said selected outlines are drawn being placed within the field of the camera lens so as to occupy the same position in space with respect to each other and to the camera lens as would the corresponding parts of the object if so placed and viewed; and in thereafter transferring onto a sheet on which the completed drawing is to be made the outlines so photographed.

3. The method of obtaining spaced basic lines from which a line drawing in true perspective of an object to be drawn may be completed which consists in first drawing on separate sheets or the like, and to a given scale, at least a portion of the actual outline of different selected spaced portions of said object; the surface of each said sheet or the like on which said outlines are drawn being non-reflective; in next photographing with a camera by successive exposures of one and the same sensitized medium, each said outline; said sheets or the like on which said selected outlines are drawn being placed within the field of the camera lens so as to occupy the same position in space with respect to each other and to the camera lens as would the corresponding parts of the object if so placed and viewed; and in thereafter transferring onto a sheet on which the completed drawing is to be made the outlines so photographed.

4. The method of obtaining linearly spaced basic lines from which a line drawing in true perspective of an object to be drawn may be completed which consists in first drawing on separate sheets or the like and to a given scale, at least a portion of the actual outline of different selected spaced portions of said object; in indicating by markings according to the same scale the linear distance between the outlined portions of said object; in next photographing with a camera by successive exposures of one and the same sensitized medium each said outline; said sheets or the like on which said selected outlines are drawn being placed one at a time according to the scale markings, within the field of the camera lens so as to occupy the same position in space with respect to each other and to the camera lens as would the corresponding parts of the object if so placed and viewed; and in thereafter transferring onto a sheet on which the completed drawing is to be made the outlines so photographed.

5. The method of obtaining spaced basic lines from which a line drawing in true perspective of an object to be drawn may be completed which consists in first drawing on separate sheets or the like, and to a given scale, at least a portion of the actual outline of selected portions of said object; the surface of each said sheet or the like on which said outlines are drawn being non-reflective; in next photographing with a camera by successive exposures of one and the same sensitized medium, each said outline without changing the position of the camera; said sheets or the like on which said selected outlines are drawn being placed within the field of the camera lens so as to occupy the same position in space with respect to each other and to the camera lens as would the corresponding parts of the object if so placed and viewed; and in thereafter transferring onto a sheet on which the completed drawing is to be made the outlines so photographed.

6. The method of obtaining spaced basic lines from which a line drawing in true perspective of an object to be drawn may be completed which consists in first drawing on separate sheets or the like, and to a given scale, at least a portion of the actual outline of different selected portions of said object disposed at an angle to each other; in next photographing with a camera by successive exposures of one and the same sensitized medium, each said outline; said sheets or the like on which said selected outlines are drawn being placed, one at a time, within the field of the camera lens so as to occupy the same angular position in space with respect to each other and to the camera lens as would the corresponding parts of the objects if so placed and viewed; and in thereafter transferring onto a sheet on which the completed drawing is to be made the outlines so photographed.

EDWARD C. HOFFMAN.